(12) United States Patent
Lehtinen

(10) Patent No.: US 6,535,598 B1
(45) Date of Patent: Mar. 18, 2003

(54) SERVICE PROVISION IN A TELECOMMUNICATIONS NETWORK

(75) Inventor: Pekka Lehtinen, Järvenpää (FI)

(73) Assignee: Nokia Corporation, Espoo (FI)

( * ) Notice: Subject to any disclaimer, the term of this patent is extended or adjusted under 35 U.S.C. 154(b) by 209 days.

(21) Appl. No.: 09/625,260

(22) Filed: Jul. 25, 2000

Related U.S. Application Data

(63) Continuation of application No. PCT/FI99/00080, filed on Feb. 3, 1999.

(30) Foreign Application Priority Data

Feb. 3, 1998 (FI) .................................................. 980242

(51) Int. Cl.$^7$ ............................................... H04M 7/00
(52) U.S. Cl. .................................. 379/219; 379/221.08
(58) Field of Search ........................... 379/219, 220.01, 379/221.08–221.12, 229, 230; 370/352, 259

(56) References Cited

U.S. PATENT DOCUMENTS

| | | | | |
|---|---|---|---|---|
| 5,379,383 A | * | 1/1995 | Yunoki ........................ | 379/242 |
| 5,386,464 A | | 1/1995 | Pruitt .................... | 379/201.03 |
| 5,544,236 A | | 8/1996 | Andruska et al. ...... | 379/201.02 |
| 5,574,782 A | | 11/1996 | Baird et al. ............ | 379/221.09 |
| 5,790,789 A | | 8/1998 | Suarez ........................ | 709/202 |
| 5,812,639 A | * | 9/1998 | Bartholomew et al. ..... | 370/352 |
| 5,920,618 A | | 7/1999 | Flesicher et al. ........... | 370/259 |
| 6,078,658 A | * | 6/2000 | Yunoki ........................ | 370/259 |

FOREIGN PATENT DOCUMENTS

| | | |
|---|---|---|
| EP | 0 569 180 | 11/1993 |
| EP | 0685955 | 12/1995 |
| EP | 0 873 029 | 10/1998 |
| GB | 2301983 | 12/1996 |
| JP | 9-55799 | 2/1997 |
| WO | 95/23483 | 8/1995 |
| WO | 95/34175 | 12/1995 |
| WO | WO 96/21310 | 7/1996 |
| WO | 96/42173 | 12/1996 |
| WO | 97/25849 | 7/1997 |
| WO | 97/36431 | 10/1997 |
| WO | 98/32293 | 7/1998 |
| WO | WO 98/55919 | 12/1998 |
| WO | WO 99/09659 | 2/1999 |

* cited by examiner

Primary Examiner—Benny Q. Tieu
(74) Attorney, Agent, or Firm—Squire, Sanders & Dempsey L.L.P.

(57) ABSTRACT

The invention relates to a method for service provision in a telecommunications network, specifically in an intelligent network. In accordance with the method, service programs (SLP) are stored in at least one network element receiving service requests, service data of objects relating to a given object class are stored in several data modules (FMP1_DT1, FMP1_DT2) and the data modules are located in at least one network element, and service is provided by starting, in a network element containing service programs, a service program in the selection of which at least the service key contained in the service request is used as a criterion. To enable increasing of network capacity as efficiently and simply as possible, service key values are used in the network element (SCP) receiving the service request to identify at least the network element storing the data module containing the service data of the object relating to the service request.

13 Claims, 8 Drawing Sheets

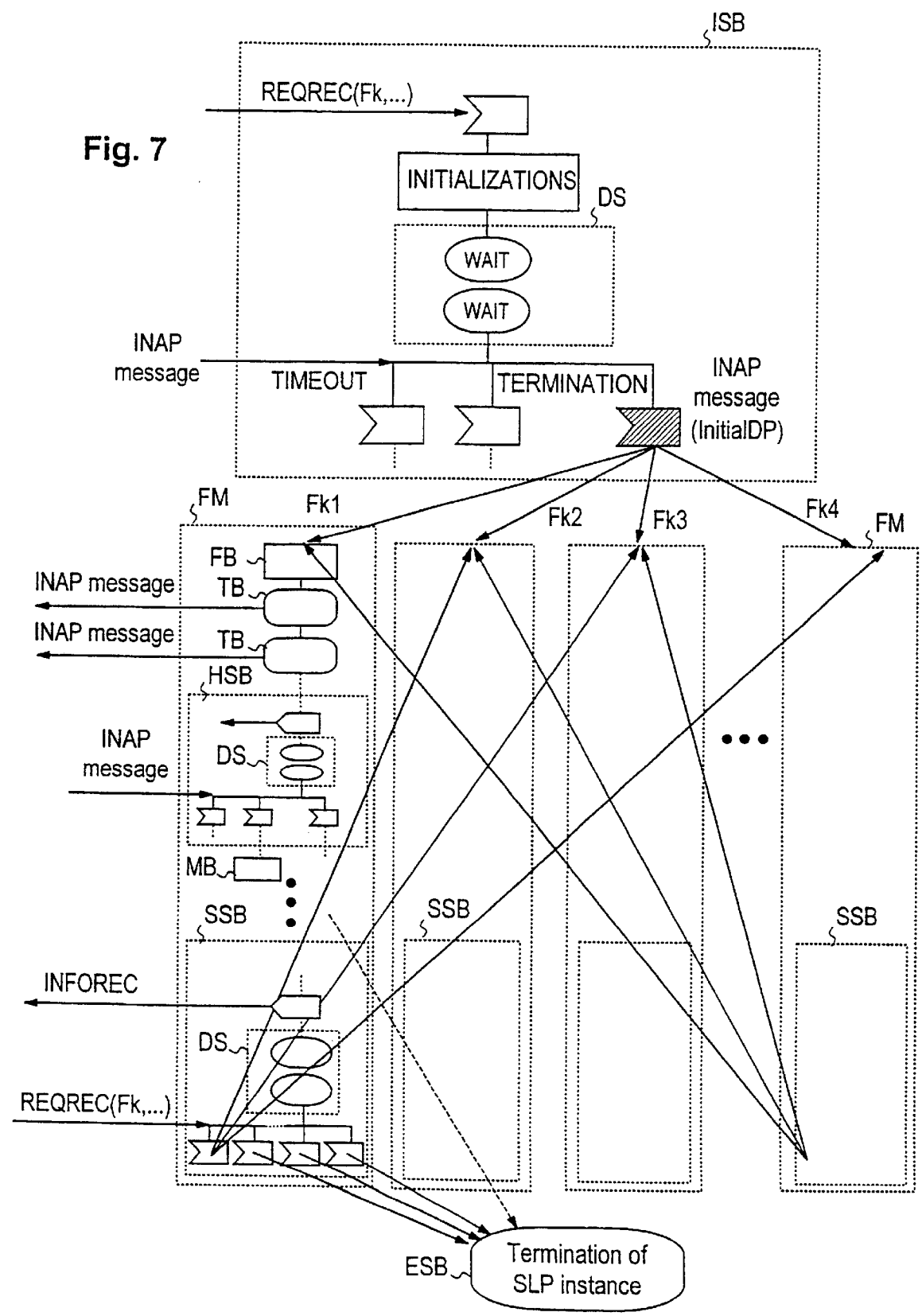

SERVICE PROVISION IN A TELECOMMUNICATIONS NETWORK

This is a continuation of application No. PCT/FI99/00080 filed Feb. 3, 1999.

FIELD OF THE INVENTION

The invention relates generally to implementation of services in a telecommunications network, particularly an intelligent network. The service may be any service produced in the network for a network user or another object.

BACKGROUND OF THE INVENTION

The rapid evolvement of the telecommunications field has afforded operators the capability of providing many different types of services to users. A network architecture that provides advanced services is called an intelligent network. The common abbreviation for intelligent network is IN.

The functional architecture of an intelligent network is shown in FIG. 1 where the functional entities of the network are shown as ovals. This architecture is described briefly below, because the invention will be described hereinafter with reference to the intelligent network environment.

The access of the end user (subscriber) to the network is handled by the CCAF (Call Control Agent Function). The access to the IN services is implemented by making additions to existing digital exchanges. This is done by using the basic call state model BCSM which describes the existing functionality used to process a call between two users. The BCSM is a high level state automaton description of the call control functions CCF required for establishing and maintaining a connection route between users. Functionality is added to this state model by using the service switching function SSF (cf. the partial overlap of the entities CCF and SSF in FIG. 1) so that it is possible to decide when it is necessary to call the services of the intelligent network (the IN services). After these IN services have been called, the service control function SCF that contains the service logic for the intelligent network handles the service-related processing (of the call attempt). The service switching function SSF thereby connects the call control function CCF to the service control function SCF and allows the service control function SCF to control the call control function CCF. For example, SCF can request that the SSF/CCF perform specific call or connection functions, for example charging or routing operations. The SCF can also send requests to the service data function SDF which handles the access to the service-related data and network data of the intelligent network. The SCF can thus for example request the SDF to retrieve specific service-related data or update this data.

The functions described above are further complemented by the specialized resources function SRF which provides the special functions required for implementing some of the services provided by the intelligent network. Examples of these services are protocol conversions, speech recognition, voice mail, etc. The SCF can, for example, request the SSF/CCF functions to first establish a connection between the end users and SRF and then it can request the SRF to give voice announcements to the end users.

Other functional entities of the intelligent network are various functions that relate to control, such as the SCEF (Service Creation Environment Function), SMF (Service Management Function), and SMAF (Service Management Access Function). The SMF includes, among other things, service control, the SMAF provides the connection to the SMF, and the SCEF makes it possible to specify, develop, test and feed IN services via the SMF to the SCF. Because these functions only relate to the operation of the network operator, they are not shown in FIG. 1.

The role of the functional entities described in FIG. 1 as relating to the IN services will be briefly described below. The CCAF receives the service request given by the calling party. The service request usually consists of lifting the receiver and/or a series of digits dialled by the calling party. The CCAF further transmits the service request to the CCF/SSF for processing. The call control function CCF does not have the service data but it has been programmed to recognize the need of a service request. The CCF interrupts the call setup for a moment and notifies the service switching function SSF about the state of the call. The task of the SSF is, using predefined criteria, to interpret the service request and thus determine whether the request is a service request related to the IN services. If this is the case, the SSF composes a standardized IN service request and sends the request to the SCF along with information about the state of the service request. The SCF receives the request and decodes it. After that it cooperates with the SSF/CCF, SRF, and SDF to provide the requested service to the end user.

The physical level architecture of the intelligent network describes how the functional entities described above are located in the physical entities of the network. The physical architecture of the intelligent network is illustrated in FIG. 2, where the physical entities are described as rectangles or circles and functional entities as ovals. The signalling connections are described by dashed lines and the actual transport which is for example speech, by continuous lines. The optional functional entities are denoted with dashed line. The signalling network shown in the Figure is a network according to SS7 (Signalling System Number 7 is a well-known signalling system described in the CCITT (nowadays ITU-T) blue book *Specifications of Signalling System No. 7*, Melbourne 1988).

The subscriber equipment SE which can include, for example, a telephone, computer, or telefax, are connected either directly to a service switching point SSP or to a network access point NAP.

The service switching point SSP provides the user with access to the network and handles all necessary selection functions. The SSP can also detect any IN service requests. Functionally, the SSP includes the call control and service selection functions.

The network access point NAP is a traditional telephone exchange that includes the call control function CCF, for example, the Applicants' DX 220 exchange which can differentiate calls that require IN services from traditional calls and route the calls that require IN services to the appropriate SSP.

The service control point SCP includes the service logic programs SLP that are used to produce the IN services. The shorter term service program will also be used for service logic programs in the following.

The service data point SDP is a database containing customer and network data which is used by the service programs of the SCP to produce tailored services. The SCP can use SDP services directly via the signalling or data network.

The intelligent peripheral IP provides special services, such as announcements and voice and multiple choice recognition.

The service switching and control point SSCP consists of an SCP and SSP located in the same network element (in other words, if the SSP network element shown in the drawing contains both an SCF and an SSF entity, the network element in question is an SSCP).

The tasks of a service management system SMP include the management of the database (SDP), network monitoring and testing, and collecting network data. It can connect to all other physical entities.

The service creation environment point SCEP is used for specifying, developing and testing the IN services, and for entering the services in SMP.

The service adjunct AD is functionally equivalent to the service control point SCP, but it is directly connected to SSP with a fast data connection (for example, with an ISDN 30B+D connection) instead of via the common channel signalling network SS7.

The service node SN can control the IN services and perform data transfers with users. It communicates directly with one or more SSPs.

The service management access point SMAP is a physical entity which provides certain users with a connection to SMP.

The above is a brief description of the intelligent network as a background to the description of the method according to the invention. The interested reader can get a more detailed description of the intelligent network in, for example, ITU-T specifications Q.121X or in the AIN specifications of Bellcore.

As stated previously, provisioning of a service is initiated in such a way that the SSF sends to the SCF a standard IN service request. The service request can be sent at certain stages of the call setup. The international standards, however, specify only one identifier for the service request sent by the SSF wherewith the desired service logic can be selected in the SCP. This identifier is called the service key.

The generally known technique for providing tailored services is such that the final service logic program SLP is selected in the SCP by means of the service key value, in which case more than one values can point to the same service logic program or there may be a dedicated service logic program for each service key value. When it is desired to add services, a new version of the existing service logic program into which more service features are encoded is produced. The new version is indicated with a new service key value. The subservices, for which the English term service feature is employed in the international standards, are termed features in the present context.

With the increase in the number of network subscribers and services, a situation is inevitably encountered in which the capacity of an individual network element is becoming insufficient. In practice, the limits of the capacity of a network element, such as an SCP network element, are first encountered for database capacity and call handling capacity. The growth of database capacity is influenced in particular by the increase in the number of subscribers and subscriber-specific services, and that of call handling capacity by the increase in services and their use.

Hence, the functional architecture of an intelligent network must in practice be implemented in such a manner that the subscriber-specific data and service logic relating to the services must be constructed into data modules in order for it to be possible to distribute, when necessary, the subscriber database and service logic software among different network elements in accordance with said division into modules.

When for instance the database and service logic software contained in an individual SCP network element are to be distributed to several different network elements, a straightforward approach would be to add new SCP network elements to the network. In such a case, the SSP exchanges should classify the subscribers into groups according to some criterion, such as the incoming circuit group, and thus it would be known on the basis of the subscriber group of the calling subscriber to which SCP network element the service request for said subscriber is to be sent. However, such a solution is not desirable, since new nodes would then be needed in the network, all of which should be capable of communicating with the SSP exchanges of the network. The SS7 signalling system used by the SSP exchanges and SCP network elements is based on a fairly old basic solution and is becoming slow. Furnishing each new network element with an SS7 protocol stack is also an expensive solution. The trigger data record in the SSP exchange normally has information on the SCP network element to which the service request is to be sent. The use of this information for identifying the subscriber data module also means that only one module per subscriber group can be accommodated in said SCP exchange.

Constructing a single combined SCP/SDP network element to increase the network capacity is not an advisable solution either, since it presents difficulties for the maintenance of the remaining network. This is due to the fact that one SCP/SDP network element is normally connected to a very large part of the remaining network, not merely to the neighbouring network elements, and thus for example updating of the different versions of the INAP protocol will cause difficulties.

For the above reasons, the most preferable approach would be to increase the throughput and capacity of the network in such a way that the above data modules are stored in an SDP-type network element with which the SCP network element can communicate for example through a fast data connection. In that case, however, it will present a problem how the SCP network element can find the necessary object-related data and service logic when a service request arrives.

SUMMARY OF THE INVENTION

It is an object of the invention to offer a remedy to the above-described situation and to provide a solution enabling network capacity to be increased as flexibly, efficiently and simply as possible.

This object is achieved with the method in accordance with the invention, which is defined in the independent claims.

The idea of the invention is to use service key values contained in a service request message to identify at least the network element in which the module storing the service data of the object relating to the service request is located.

By using the solution in accordance with the invention, the location of the data of an object (e.g. a subscriber) relating to an individual service request can be identified very simply from the point of view of the entire network. The use of a service key in accordance with the invention firstly makes it possible for the SCP receiving the service request to find the network element in which the object-related service data are located. In a preferred embodiment of the invention, the SCP is also capable of identifying the relevant data module in a very simple manner irrespective of whether said module is located specifically in the same SCP network element or in some other network element.

When service key values are used in the above manner to identify data modules and when a given set of data modules comprises one object class, the result is that a given service key value set also identifies the object class and its services. Each object class thus has a specific service key value set, by which all services of said object class are identified.

BRIEF DESCRIPTION OF THE DRAWINGS

In the following, the invention and its preferred embodiments will be described in greater detail with reference to examples in accordance with the attached FIGS. 3a . . . 12 in the accompanying drawings, in which FIG. 7 illustrates the functional configuration of one service program.

DETAILED DESCRIPTION OF THE INVENTION

When a network subscriber initiates a call, the terminal exchange of the subscriber first receives information on the calling subscriber's desire to place a call. This information can arrive at the exchange for example as a Setup message in accordance with standard Q.931. If the terminal exchange is not an SSP exchange, it can route the call attempt to an SSP exchange.

Figure 1:
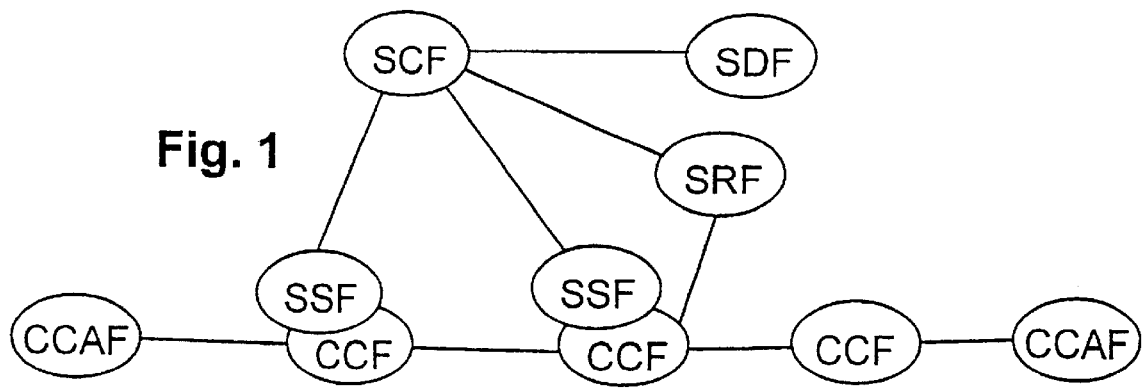
FIG. 1 illustrates the functional architecture of an intelligent network.
Figure 3A:
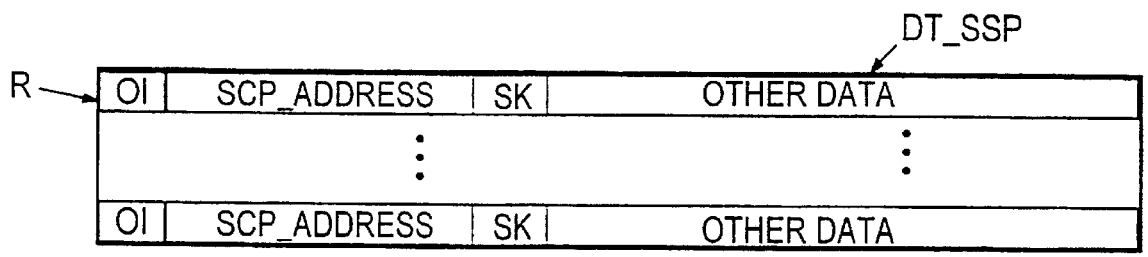
FIG. 3a illustrates the content of a data table in an SSP network element, arranged according to main object classes.

When the call control of the SSP exchange detects that a subscriber is concerned who needs IN services, transfer of the control to the IN is triggered and processing of the call attempt is "frozen". In the SSP exchange, each logically distinct main object class has its dedicated data table DT_SSP (FIG. 3a) comprising object-related rows. An object identifier OI is stored at the beginning of each row R as a search key. In addition, the row comprises at least a field storing the address of the SCP network element (SCP_ADDRESS) to which the service request is to be sent and a field containing a service key value SK.

The SSP exchange then sends to the SCP an Initial_DP message, which is a standard message between the SSF and SCP, generated by the SSF upon detecting at any detection point of the call state model that a service request is necessary (a detection point is a point in the call state model at which the control can be transferred to the IN). Initial_DP is thus the message that starts the dialog between the SSP and the SCP relating to the provision of each service. The information elements included in the message by the SSP exchange include at least the calling and called number and the service key.

An INAP (Intelligent Network Application Part) message set is used between the SSP and SCP. (The message set is described for example in the standard ETSI IN CS1 INAP Part 1: Protocol Specification, Draft prETS 300 374-1, November 1993, to which the interested reader is referred for a more detailed exposition.) No actual protocol has been defined in the standards, only the messages used. In addition to optional parameters, also so called extension parameters have been defined in the messages. Particularly the last-mentioned are parameters for which different operators desire data content definitions of their own. For this reason, the SCP network element must have a large number of service logic programs SLP for implementing different services. Hence, the different service logic programs may use messages of the same INAP message set, but in a different order and with different parameter values. The actual protocol level in the communication between the SSP and SCP is thus represented by these different service logic programs. Each service logic program sends to and receives from the network INAP messages.

Figure 3B:
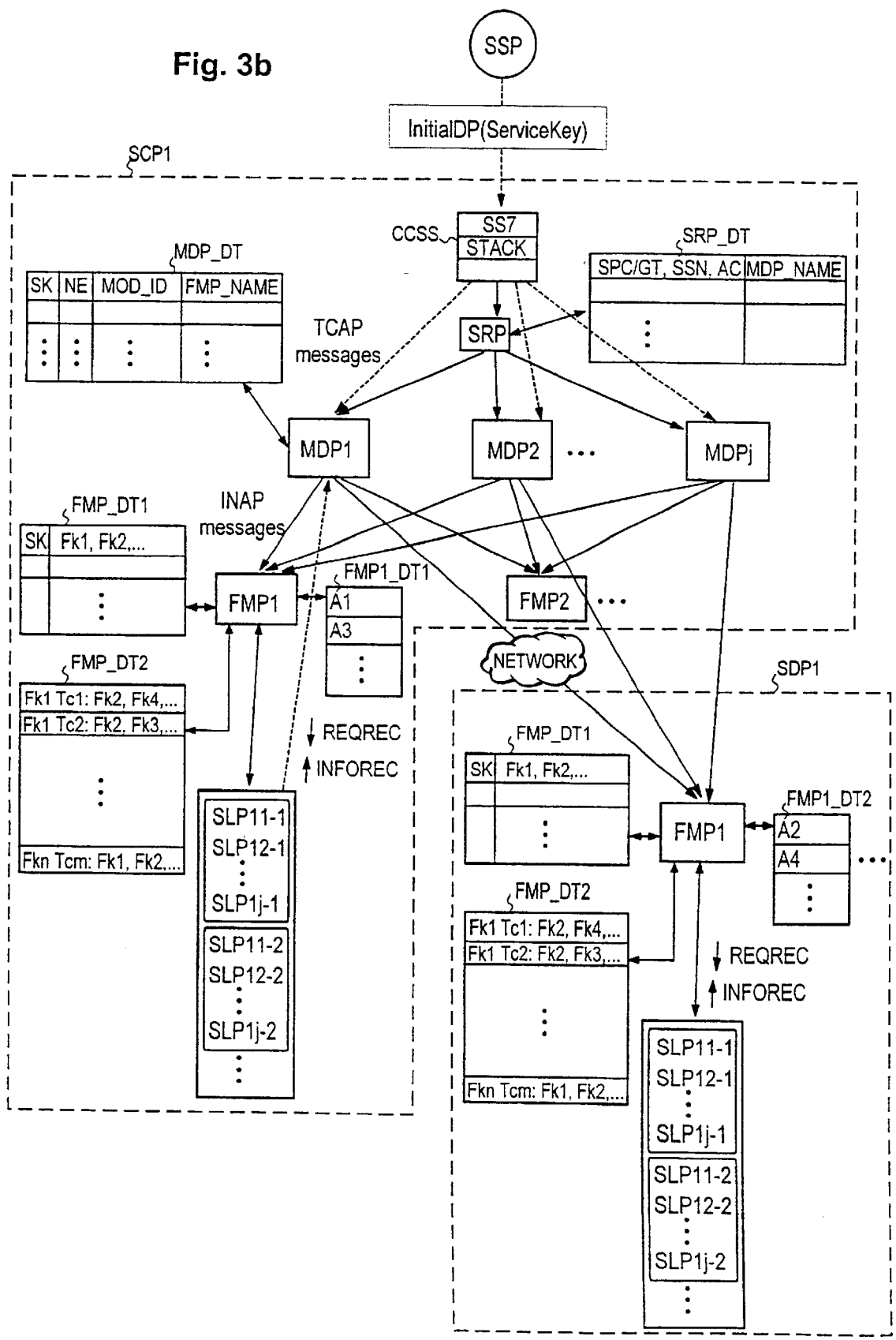
FIG. 3b illustrates the functional architecture of SCP and SDP network elements in accordance with the invention when parts essential to the service logic software are looked at, FIG. 4 illustrates the content of an object-related data row in SCP and SDP network elements.

FIG. 3b illustrates the functional architecture of SCP and SDP network elements in accordance with the invention seen from the point of view of the service programs. The service requests arriving at the SCP network element come through a common channel signalling stack CCSS to the receiving program block SRP (SS7 Receiver Program). One such receiving program block is provided for each common channel signalling stack of the SCP network element. For simplicity, the example of the figure only shows one stack and one receiving program block.

If one SCP network element is connected to more than one SSP network element in which different versions of the INAP message set are used, the definition of the data content of the data messages received by the SCP is different depending on which SSP the SCP is communicating with. For this reason, further processing of the messages from the receiving program block onwards must in practice be differentiated in accordance with which INAP message set is concerned. Thus, what is also essential is that the receiving program block SRP is independent of the INAP message set employed.

The receiving program block SRP receives from the network (from SSF entities) standard TC_BEGIN messages. The task of the program block is to identify the relevant INAP message set version on the basis of the TC_BEGIN message and to forward the INAP messages contained in the component primitives further to the message distributor program block MDPi corresponding to said message set, wherein i=1,2, . . . j and j is the number of different INAP message sets used.

Hence, at the level next to the receiving program block the network architecture includes program blocks MDPi (i=1, . . . j), one for each INAP message set used. Each distributor program MDPi receives TCAP messages from the network and forwards INAP messages, receives INAP messages from the service logic programs, and sends TCAP messages to the network. (A TCAP message comprises a header and one or more component primitives. Each component primitive can contain one INAP message at most. Each component primitive also has a subheader of its own.

All of these header parts are produced when messages are sent to the network and they are removed when messages are received from the network.)

When an initiation request for a service dialog—which arrives as a TC_BEGIN primitive (containing an Initial_DP message)—is received on a network element, a new instance of the receiving program SRP is created that will search the correct distributor program block, create an instance thereof for the use of said service request, and transmit a TCAP message to said instance. Thereafter the instance of the receiving program block is deleted. The distributor program instance receives all TCAP messages subsequently arriving from SSP. The search for the correct distributor program takes place in such a way that the receiving program block SRP reads from the header of the TC_BEGIN message either the identifier of the sending SSP network element (SPC, Signalling Point Code, or GT, Global Title) and additionally the identifier of, the subsystem (SSN, SubSystem Number), or alternatively the relevant application context identifier AC, and searches on the basis thereof from the data table SRP_DT of the SRP level the name of the distributor program, MDP_NAME, corresponding to the INAP message set in question.

Thus, the architecture of the SCP network element includes for each INAP message set a dedicated program block MDPi, the task of which is to decode the received messages (at least the Initial_DP message containing the service key parameter) and to distribute the messages to their correct receivers.

In the functional hierarchy of the network element, the main program blocks are located at the next hierarchy level after the distributor programs. These main program blocks are denoted by FMPi (Feature Manager Program) (i=1,2, . . . ). The main program blocks constitute the processes controlling the actual service logic programs SLP, supplying them with the data they need. Thus, the main program blocks are responsible for managing the services and features.

The message distributor programs distribute each service request to the correct main program block. To enable this, the SCP network element has a dedicated data table MDP_DT for the distributor programs, in which the service key value SK is presented at the beginning of each data row as a search key. On the basis of the service key value that arrived in the Initial_DP message, the distributor program block searches from the data table the correct row. This row stores the address of the network element NE_A containing the data module relating to said service key value, the identifier of said data module MOD_ID, and the identifier of the main program block (FMP_NAME) that serves as the recipient in the case of said service key value. The data table is preferably common to all distributor program blocks MDPi.

The distributor program block compares the network element address found in the data table to the address of the SCP network element. If the distributor program block finds on the basis of the comparison that the data module is located in the same SCP network element, it creates an instance of said main program for the use of said service request and forwards to said instance a separate initiation message indicating the service request that arrived. Thereafter it also forwards an INAP message relating to the service request (initialDP) to said instance.

If the distributor program block finds on the basis of the comparison that the data module is located in another network element, for example an SDP network element SDP1, it sends said initiation message via the network to said network element, using the protocol that is used between said network elements (e.g. X.500). A separate initiation message is needed, because an SDP network element is not capable of responding to an arriving InitialDP message unprepared like an SCP element is (since a different protocol is used between the SCP and the SDP than between SSP and SCP, as was stated above). On the basis of the initiation message, an instance of said main program block is created in the other network element, and this instance is placed at the disposal of said service request.

Since service logic needs are different for different object types, it is advantageous to implement the SCP network element in such a way that it has separate main program blocks for the logically distinct main object classes contained in the SSP exchanges. Said classes may include calling subscriber class, called subscriber class, destinations (beginning of dialled number), subdestinations (the entire dialled number), routes, circuit groups, etc. Furthermore, the subscribers may be in different classes according to which network they belong to. Calling and called subscribers can be divided for example in accordance with whether they are (calling or called) subscribers in a fixed network or mobile network. Objects in this context denote such network-related entities to which information can be attached in the network element—e.g. in the case of an intelligent network in an SSP network element—indicating, for an individual call attempt, whether a service request is to be sent to the network element offering services (which in the case of an intelligent network is an SCP network element).

As stated previously, each distributor program block utilizes the service key parameter that arrived in the service request message to define the receiving main program block. This means that for service requests relating to a given main object class (e.g. calling subscribers), the SSP exchange has to set a service key value that is different from the service key value of objects belonging to another class (e.g. called subscribers) (even though service of the same type is concerned). A wide variety of service key values may correspond to a given main program block, but the service key value sets relating to two different main programs may not overlap.

Hence, a given service key value set is mapped to services of a given main object class, e.g. in such a way that a first value set represents services to calling subscribers, a second value set services to called subscribers, etc. This is also a direct consequence of the fact that the modules are object class specific and each module is identified with a specific service key value set. Consecutive values should preferably be selected as the service key values corresponding to modules of the same object class, and thus the services of the object class are identified as a specific value range for the service key.

Each main object class has a dedicated data table FMPi_DT (i=1,2, . . . n). These data tables will be termed main tables in the following. Thus, the SCP network element has a dedicated main table for each main program block. Each main table has one data row for each object belonging to said class. For example, the data table (FMP1_DT) used by the main program block FMP1 relating to calling subscribers has one data row for each calling subscriber Ai (i=1, 2 . . . ), the data table (FMP2_DT) used by the main program FMP2 relating to called subscribers has one data row for each called subscriber Bi (i=1, 2 . . . ), the data table used by the main program relating to subdestination objects has one data row for each subdestination in use, the data table used by the main program relating to destination objects has one data row for each destination in use, etc.

The figure presents only the data table of calling subscribers, which in this exemplary case is divided into two different modules that are denoted with FMP_DT1 and FMP_DT2. The first of these is located in SCP network element SCP1 and the other in SDP network element SDP1.

Figure 4:
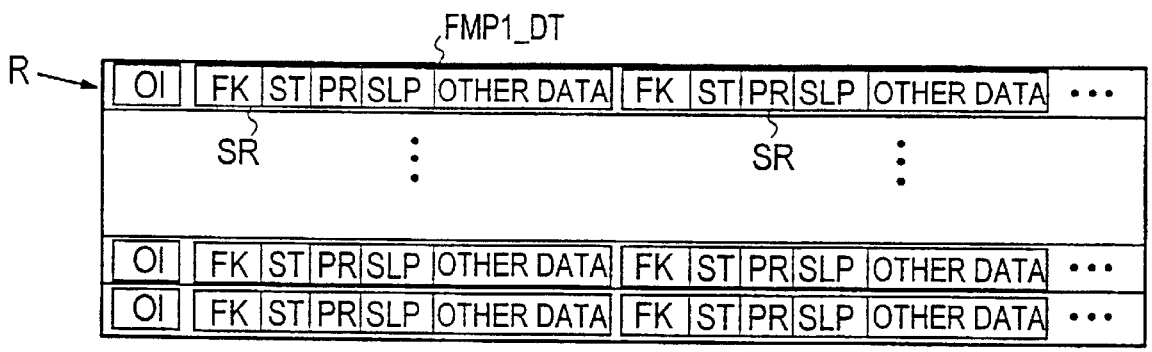

In each row of the main table modules, information is stored in the manner shown in FIG. 4, defining what kind of feature set said object has activated. An object identifier OI is stored at the beginning of each row R as a search key. The main program block searches the correct row from its data table by means of the value of the object identifier contained in the INAP message. The row contains successive subrecords SR, one for each feature. At the beginning of each subrecord, there is a field FK containing a feature key Fki (i=1,2 . . . ), indicating which feature is concerned. Thereafter the subrecord may have for example a status field ST, containing information on whether said feature is active or passive, and a priority field PR, containing a priority number. These priority numbers of subrecords indicate the relative order of execution of the features. Each subrecord further has at least field SLP, containing the identifier of the service logic program that executes said feature. The service logic programs form the lowest hierarchy level of the network element.

Preferably there are dedicated service programs for each main object class. Furthermore, there is a clone of each program dedicated to each INAP message set (i.e., each distributor program). In the figure, the service programs are denoted with reference SLPxy-z, where x indicates the main object class to which the program belongs, y indicates the INAP message set to which the program belongs, and z indicates the consecutive number of the program within the main object class.

In accordance with the hierarchy of the network element, the instance (SLPi) of the lowest level of one service request dialog is called a child, the instance of the next level (FMPi) is called the parent, and the instance (MDPi) of the level next to that is called the grandparent. An older instance always begets the younger instance. A grandparent may be located in a different network element than the parent and child, which are located in the same network element.

In practice, one feature implemented by a service logic program may be for example playing of an announcement to the subscriber ("play an announcement") or an operation by which the calling subscriber is requested to dial additional numbers ("prompt and collect user information"), or a connect operation (a CONNECT message is sent to the SSP exchange, by which the SSP exchange is requested to connect the call to a given address).

The order of execution of the features can be indicated for example in the above-stated manner by adding a priority number field PR to the subrecords, in which case said numbers indicate the relative order of execution of the features. There are also other alternatives for achieving the correct order of execution, as will be seen hereinafter. This way, however, is simple and makes it possible that the same service key value can indicate a different order of execution e.g. for two different calling subscribers.

In addition, one or more separate data tables are provided in the network element for the main program blocks, having a data row for each service key value that is in use in the domain of several different main program blocks. The example in the figure has one data table FMP_DT1 that is common to all program blocks (all main program blocks read said data table). At the beginning of each data row in the data table, the service key value SK is provided as the key. Each row contains data on the features Fki (i=1,2 . . . ) relating to said service key value, that is, on the services that are allowable features in the case of said service key value. Furthermore, the row may contain information as to in which order these features are executed, or the order of the feature keys may directly indicate the relative order of the features. The main program block reads from this data table the row corresponding to the received service key value, whereby it finds the set of features that are allowable features in the case of said value. Thereafter the main program block reads from its dedicated data table or data table module (if the table is divided into several modules) the row corresponding to the identifier of said object (e.g. calling subscriber). From this row, the main program block finds the identifier of the service logic program SLPi (i=1,2 . . . ) that is to be started. From the row of the class-specific table or module (for instance the table or module of calling subscribers), the main program block takes into consideration only those features which relate to said service key value (i.e. the ones belonging to the allowable set searched above), and of these eventually only those indicated as active at said object.

At this stage of execution of the service request, the features relating to the object and their relative order of execution are known. Thereafter the main program block produces an instance of the service logic program corresponding to the feature that is the first in turn and requests it to start execution of the service.

The FMP instance thus sends an Initial_DP message to the service program which has the highest priority and whose identifier the main program block read from the relevant subrecord of the object-related row. First, however, a separate request message REQREC is sent to said SLP instance, since the Initial_DP message must be sent in its standard format (ASN.1 format) in which its information content is not sufficient. The service logic program thus needs also other data in addition to that contained in the INAP message, for example the value of the feature key, which it receives in the request message.

Figure 5:
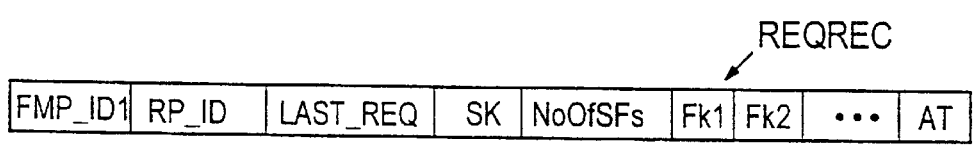
FIG. 5 shows the structure of a request message sent to a service program instance.

FIG. 5 shows an example of the data structure of the request message sent. The request message first has a field FMP_ID1, containing the identifier of the sending FMP instance. Thereafter follows a field RP_ID, containing the identifier of the program block to which the SLP should send its messages relating to this dialog. These acknowledgement messages can be sent both to the FMP instance (parent) and the MDP instance (grandparent). The messages for the last-mentioned are sent to the SCP network element if the module of the object relating to the service request is located in the SDP network element. By sending acknowledgement messages to the distributor program instance, the load on the main program blocks within the SCP network element can be diminished, since the MDP instance attends to the sending of outbound messages to the network in any case. The next field LAST_REQ contains a Boolean variable indicating whether still another request message is bound for the SLP instance after it has executed the features which were requested in that request message. The field SK contains the service key value obtained from the SSP network element. The next field, NoOfSFs, indicates the number of features contained in the request message, and the fields Fki (i=1,2 . . . ) subsequent to said field contain the keys of said features. The last field AT contains a description of how the service dialog is to be terminated if the execution of the features fails.

The structure of the service programs is such that they are composed of parts each of which executes a given feature.

Thus each SLP executes only those features whose feature keys arrive in the request message. If more than one feature belonging to the allowable features is active in the object-related row and the same SLP identifier is related to all said features, the FMP can send all these feature keys in one request message (providing that it is otherwise allowable to execute all said features in succession). If the features contain the identifier of several different SLP programs, the FMP instance sends request messages to said SLP programs in the order indicated by the subrecords in the object-related row. The procedure may also be such that only one feature key is sent in one request message.

Having executed the feature, the SLP sends an acknowledgement message INFOREC to those elements (parent and/or grandparent) which are indicated in the request message REQREC. In the acknowledgement message, the SLP instance also indicates in what manner the feature was terminated. If, for example, the execution of the feature fails, the feature to be executed next can be different compared to a normal case in which the execution of the feature is successful. If the data module is located in the SDP network element, the acknowledgement message is sent to the SCP network element. The messages to and from the network pass through the grandparent (SCP) irrespective of whether the grandparent is in the same or different network element than the service logic programs that provide the service.

Figure 6:
FIG. 6 depicts the structure of an acknowledgement message sent by the service program instance.
Figure 2:
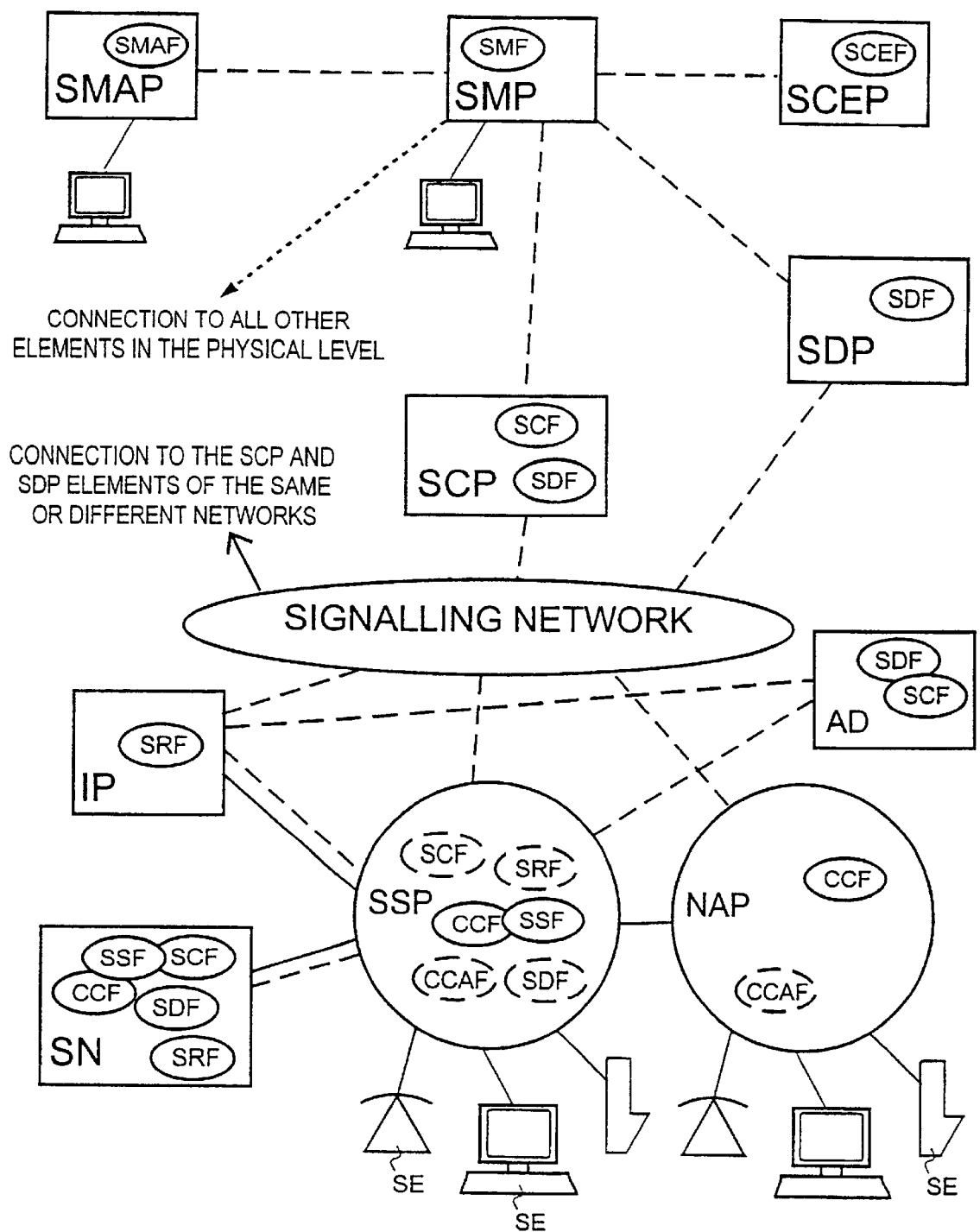
FIG. 2 illustrates the physical architecture of an intelligent network.

FIG. 6 illustrates one possible structure of an acknowledgement message INFOREC sent by an SLP instance. The first field SLP_ID2 indicates the identifier of the sending SLP instance. The next field WAIT contains for example information on whether a response is awaited from the network before the service can be continued. The field FLAG_D contains a Boolean variable indicating whether the SLP instance terminates itself after sending of an acknowledgement message or not. The field LAST_REQ again contains the same information that the child has last received from the parent in said field (the grandparent thus also receives said information). The next field LAST_INFO again contains a Boolean variable indicating whether the SLP instance has completed the last feature of the request message it received. The next field Fk contains the key of the feature in which said message arrives as an acknowledgement. The field CC contains the termination code of the feature just completed. The field ECC can indicate slight errors for which a separate error message need not be sent. The field EndDIg contains information on in which way said SLP instance desires its grandparent to terminate said dialog. The dialog can have different ways of termination, for example depending on whether a message is desired to be sent to the network, or if a message is sent, what information elements are included in the TC_END primitive to be sent.

In a preferred embodiment of the invention, the acknowledgement message further contains a field NFk, in which the key of the feature that should be executed next can be indicated. This field and its use relate to a preferred embodiment of the invention that will be described hereinafter.

Since the internal messaging within the network element does not relate to the actual invention, it will not be described in detail in this context. What is essential for the invention is that the service program instances receive both internal messages and messages arriving from the network (INAP messages), that the (internal) request and acknowledgement messages are used to attend to the execution and concatenation of the features, and that the acknowledgement message can also be used to indicate how the execution of the feature succeeded and possibly also which feature is to be executed next.

In the following, the basic configuration of one service logic program SLPi will be described with reference to FIG. 7. Each service logic program comprises service independent building blocks SIB. The SIBs are blocks from which service designers assemble service features and services. In other words, the SIBs are the smallest blocks from which services and service features are assembled. A service consists of several service features and a service feature again consists of several SIBs, even though in some cases a service feature may consist of only one SIB.

Each SLP consists of a separate initial state block (i.e., initial state SIB), one or more feature modules FM, and a separate end state block ESB (i.e., end state SIB). There are typically several parallel feature modules, but the initial state block and end state block are common to all parallel feature modules of a service program. Of these blocks, the term state block is used, on the one hand because they contain a delay state in which a response from the outside is expected and on the other hand because the service programs do not elsewhere contain such delay states in which an event is awaited.

Each SLP starts with a generic initial state block ISB the task of which is to receive the service dialog initiation message arriving from the network and to direct the execution of the service to the start of the correct feature. The sending main program block sends a request message REQREC (containing, in accordance with the above, for example one or more feature keys Fk) and the related actual INAP message (that has arrived from the network) in succession. For this reason, the initial block has a delay state DS in which the SLP instance awaits after the request message the related Initial_DP message. When the Initial_DP message arrives, the execution of the program branches off to one of the feature modules FM in accordance with the key of the feature to be executed first. The initial state block further performs various initialization tasks that are the same for all service programs. Under the delay state DS the service logic also needs at least a branch for processing a timeout message possibly received, indicating that the INAP message has been awaited for too long, and a branch for processing the termination message internal to the network element (or passed between the SCP and the SDP), by means of which the execution of the service is terminated for example on account of an error. During the execution of the service, the network element may also receive from the network an error message relating to said service dialog, as a result of which the service has to be terminated. In these error situations, the routine enters the end state block ESB directly.

After receipt of the InitialDP message in the initial state block, the service proceeds to one of the feature modules FM. The start of a feature normally comprises a function block FB in which the information contained in the initiation message is processed.

The execution of the service logic employs a dedicated messaging block (messaging SIB) for each message of different types that is sent from the service program to the network. In general, the function block at the start of the feature is succeeded by one or more of such messaging blocks. The purpose of the function block preceding the messaging blocks for its part is to prepare the data that is set in the information fields of the messages in the messaging blocks.

If any one of the messaging blocks is such that a specific response that is always received for said message in the case of faultless operation is awaited to said type of message, a generic halt state block HSB is added after the messaging block, in which the service logic awaits the response expected by the service logic (an INAP message of said type) from the network. Genericity means that the code used to implement the block is the same irrespective of at which point of the service program or in which service program the block is located. Only the variable given as entry information to the block, indicating the type of message awaited, is block-specific, since it is dependent on the type of the message sent to the network previously.

Some of the messages sent are such that they always receive a response message in connection with normal (faultless) operation, and one must await the response prior to proceeding with the execution of the service. Such response messages will be termed synchronous responses in the following. Some of the messages sent for their part are such that the execution of the service logic is continued without awaiting a response. When such responses arrive from the network on the SCP network element, the service program receives them in any suitable delay state, even though it is not awaiting in a specific halt state. Such response messages will be termed asynchronous responses. Some of the messages sent for their part are such that no response message to them arrives. Asynchronous messages also include error messages from the network, which can arrive at any time, and additionally such internal messages that can arrive at any time, for example internal termination messages. Each halt state block instance is capable of receiving, during waiting, any asynchronous response (possibly) arriving prior to a synchronous response.

Each feature module FM can contain one or more halt state blocks (and each halt state block can have one delay state in which a response is awaited).

Each instance of the halt state block is thus capable of receiving all possible messages that may arrive during the halt state. For this reason, the service logic must branch off at the end of the halt state block according to the type of the message received in the halt state. Consequently, it is possible to use in each such receiving branch a generic message preprocessing block MB, containing the functions that transfer the information received in the message to the use of the service program. In other words, in the preprocessing block the values of the parameters received in the message are transferred to the corresponding variables. One such preprocessing block is provided for each message type.

Furthermore, at the end of each feature module FM there is always a separate stop state block SSB, which indicates the end of a given feature before the start of the next feature or before the termination of the SLP instance. An acknowledgement message INFOREC is sent from the stop state block about the execution of the feature. On the basis of the termination code Tc contained in the acknowledgement message (in field CC), the main program block may e.g. define the next feature module and send to the stop state block the next request message REQREC, which contains the keys Fk of the features to be executed next (one or more keys). Hence, at the end of the stop state block a (new) feature key acts as a branching variable. From the point of view of the service logic, the stop state block thus serves as a switch that switches the service to proceed at the correct feature module.

When there are no features to be executed and it is not necessary to await asynchronous responses, the process jumps to the generic end state block ESB, in which suitable termination messages can be sent to the network and for example storage operations for various counters can be performed and the SLP instance can be terminated. The end state block comprises the termination operations that are common to all services.

The number of different termination codes available is generally dependent on what feature is in question. In the simplest case, there may be only two termination codes: feature executed successfully or execution of feature failed. If the feature is connect, for example, the termination code may indicate e.g. these four different events: called subscriber free, called subscriber busy, called subscriber does not answer, and connection setup failed.

Figure 8:
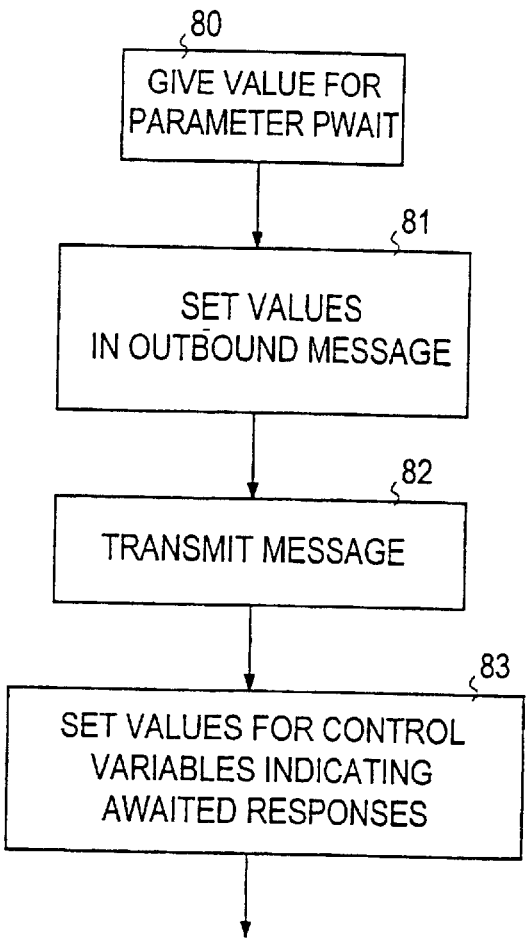
FIG. 8 illustrates the messaging block (i.e., messaging SIB) of the service program.

FIG. 8 illustrates the structure of one messaging block TB. In the messaging block, a value is first given to parameter PWAIT, which indicates whether a synchronous response is awaited to the message sent (step 80). This parameter receives e.g. the value one if a synchronous response is awaited and otherwise zero. Thereafter, values are set in the data fields of the outbound message (step 81) and the message is sent (step 82). When the message has been sent, the correct values are set for the control variables indicating the responses awaited (step 83). The message may e.g. be of the type ApplyCharging, which is used in charging and has the operation code 35. To this message, an ApplyChargingReport message having the operation code 36 is awaited from the SSP. Thus, in step 83 the value of the variable indicating the type of the message awaited is set as 36. There is one messaging block for each message type to be sent to the network, i.e. in practice there are about 15 messaging blocks, which is the number of (standard) message types sent from the SCF to the SSF.

Figure 9:
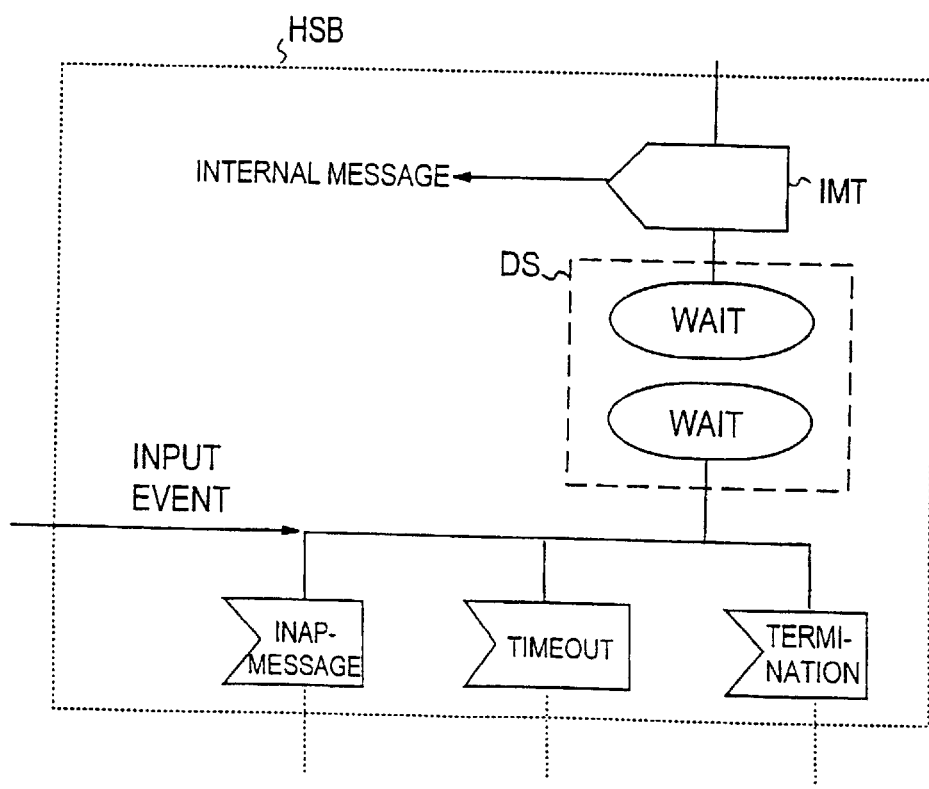
FIG. 9 illustrates the halt state block of the service program.

FIG. 9 illustrates the functionality of the halt state block HSB. In addition to the above, what is essential is that this block can include functions that are inessential to the actual service logic (needed by the subscriber). Such functions include transmission and reception of data messages that are not network messages (INAP messages) but messages internal to the network element, wherewith for example the timeouts or acknowledgements performed within the network element are handled. The halt state block thus has one or more internal message transmission blocks IMT, wherefrom a message internal to the network element is transmitted and at least one delay state DS, in which a synchronous response (a specific INAP message) is awaited (which is hence called a synchronous halt state). Under the delay state there are additionally—as above—at least branches for processing (a) a timeout message indicating that one has awaited too long in the delay state, and (b) a termination message internal to the network element, wherewith the execution of the service is terminated for example on account of an error. If an internal timeout or termination message or for example an error message arriving from the network is received, the routine enters the end state block ESB directly. Thus, the branching variable used at the end of the halt state block is the type of the received message.

The value of the parameter PWAIT can be given in the halt state block as well.

Figure 10:
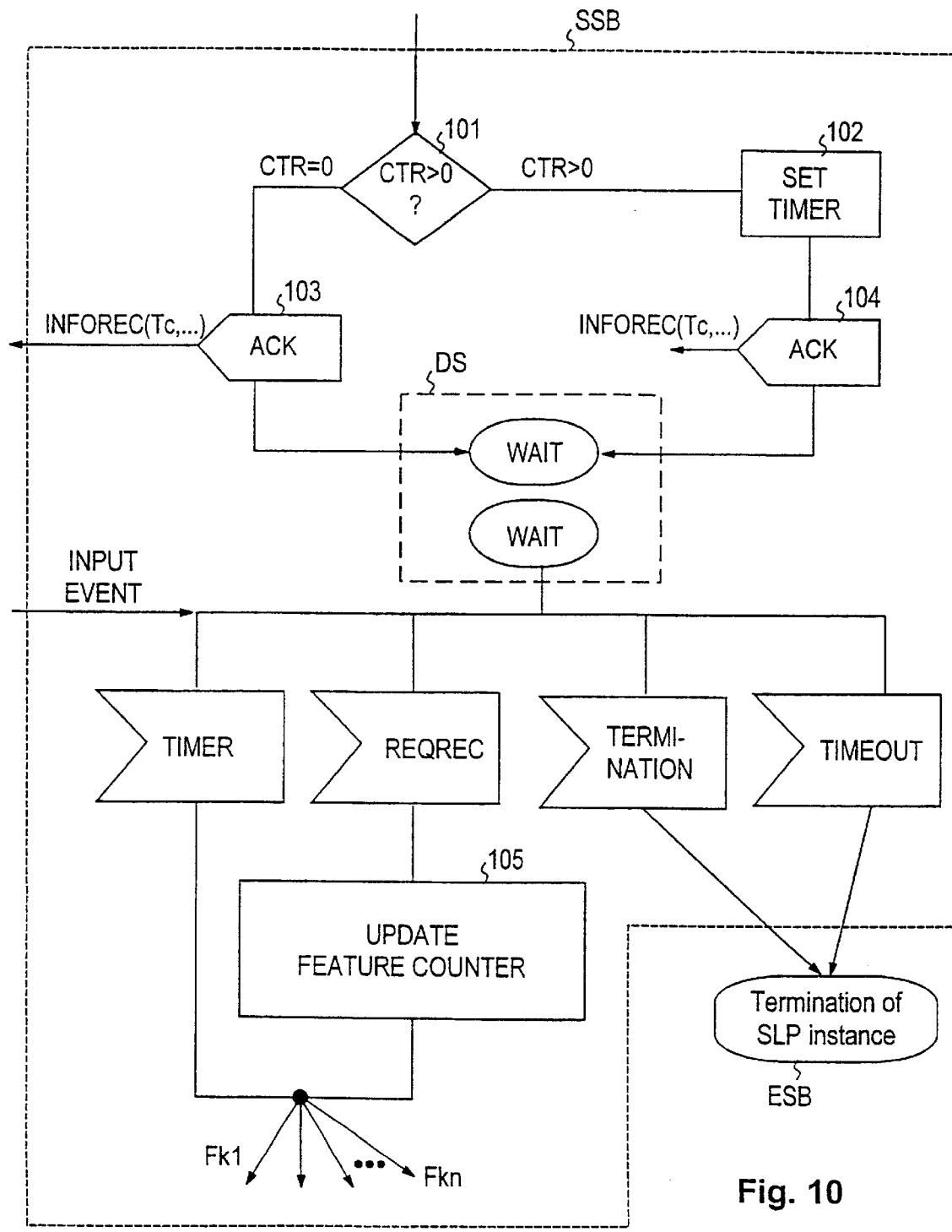
FIG. 10 illustrates the stop state block at the end of each feature.

FIG. 10 illustrates the stop state block SSB provided at the end of each feature module. It is tested at the start of this block (step 101) whether there are still features remaining,- i.e. whether the value of the feature counter CTR is higher than zero. If this is the case, a timer measuring a given short time is set (step 102), an acknowledgement message INFOREC is sent (step 104), and a delay state is entered to await an entry event.

If there are no features remaining (CTR=0), an acknowledgement message INFOREC (step 103) is sent and a delay state DS is entered to await an entry event.

In step 104, the acknowledgement message (field Fk) sent indicates to the main program that the service program still has features to perform, and thus the main program does not send a response message to the service program. Correspondingly, the acknowledgement message to be sent in step 103 indicates that the service program no longer has features to perform.

If there are still features to be executed, the entry event is a(n internal) message indicating that the timer set in step 102 has expired. In that case, the routine goes over to the start of the feature indicated by the next feature key.

If a new request message REQREC is received from the main program block in the delay state, the feature counter (step 105) is updated, whereafter the routine transfers to performing the features indicated by the new request message. As above, there are also branches below the delay state that are intended for the processing of the possible timeout and termination messages.

If the keys of all features were sent already in the first request message, the main program sends, after the acknowledgement it received from step 103, a termination message in response to which the execution of the service logic transfers to the end state block.

If all feature keys are not sent at a time, but for example only one key per request message, and the service still has features to perform, a new request message containing the keys of the features to be performed next (one or more keys) is sent after the acknowledgement of step 103.

To find one or more features to be performed next, another data table FMP_DT2 (FIG. 4) common to a given set of main program blocks is used at the main program level. This data table indicates the mutual interaction of the features. The primary search keys in the data table are the feature key Fk and the termination code Tc. The table contains the possible features for each feature/termination code pair. In other words, the table always contains the set of features that is possible to perform next when the executed feature and its termination code are known. When the set of features that can succeed the feature just executed has been found in the table, the feature having the highest priority in the object-related data row (or in data table FMP_DT1) is selected from among said features as the one to be executed next. When this feature has been executed, a termination code is again received in the acknowledgement message, and thus a new feature set is again found on the basis of the termination code and the feature key, and the feature to be executed next is selected from this set on the basis of the object-related data.

To minimize the number of messages to be transmitted, it is advantageous to proceed in such a way that several feature keys can be sent in one request message every time it is known that said features can be applied in succession irrespective of what their termination code is. In that event, the main program must go through the non-executed features in the order of priority to check that the next feature is allowable with all termination codes of the preceding feature. If, on the other hand, the allowability of the next feature is dependent on the termination code of the preceding one, the main program must execute the above check and selection operations and subsequently send a new request message.

It is also possible that on the basis of the termination code, only such features (one or several) that are not in the object-related row are found in the data table. This happens in exceptional situations when the termination code indicates that the execution of the service has not succeeded in the normal way. In practice, for example, a connect feature may succeed in a normal situation, but if for instance a calling subscriber did not provide a sufficient number of digits, a feature can be executed whereby the calling subscriber is requested to dial more numbers, or if the termination code indicates for example that the dialled number is not found, the service can continue with a voice announcement feature.

Generally, it can be stated that a service feature is implemented with successive blocks which include an initial state block (only for the first feature), a first number of function blocks, a second number of messaging blocks, a third number of halt state blocks, a fourth number of message preprocessing blocks, and a stop state block. The number of the messaging, halt state, and preprocessing blocks may also be zero. From the end state block ESB, there is no return to the same or a new service feature. The service does not necessarily end, however, when the end state block is entered for the first time, since the FMP is capable of generating a new instance of a new or the same SLP, if this is necessary to complete the service.

In the simplest case, the feature module (i.e., feature) comprises one function block, one messaging block and one stop state block (no halt state block). This is the situation for example if an initiation message arrives from the SSP exchange to the effect that the SCP network element need only send to the network a CONNECT type message (to which no synchronous response is awaited).

In addition to the building blocks described above, the service programs may comprise small auxiliary or special functions at most. A separate set of auxiliary building blocks can be defined for such auxiliary functions. Auxiliary blocks are thus blocks that comprise only very small functions, for example branching off in a service logic on the basis of individual data. Such branching off can be effected by means of one branching command, in which case the block containing said branching command is an auxiliary building block. One service independent building block belonging to this group, wherewith a jump directly to the end of the feature module is realized for example in an error situation, will be described hereinafter. This group may also include for example a SIB wherewith the identifier is compared to a reference value. Such a SIB is also defined in the international standards.

There can in practice be several dozens of different types of function blocks, but they are nevertheless such that no messages are sent therefrom to the network and no messages are received from the network (nor are internal messages received). A function block may be e.g. such that reads information from a database.

By means of the state blocks in accordance with the invention, service independent building blocks are formed for the reception of an initiation message (initial state block), reception of synchronous responses arriving from the network (halt state block), concatenation of features (stop state block), and for service termination operations that are the same irrespective of which service logic program is concerned (end state block). State blocks of the same type are similar in all service programs. Also the end state block terminating the service is called a state block, since in said block release messages must be sent to the network and a final response from the network (CallInformation Report, a message that the system must be capable of receiving even after a release message has been sent to the network) must be awaited (in delay state). Termination operations are carried out in the end state block also in cases where a leap is made from the middle of the feature module directly to the end state block to terminate the service.

The reception of all possible network messages is included in the initial state block, halt state block, stop state block, and end state block. More precisely, the reception of the initiation message is included in the initial state block and the reception of all other network messages in the other state blocks. The reception of synchronous responses is only included in the halt state block. Besides these four state blocks, there are no other delay states, and thus no delay states or reception logic relating to them need to be embodied in the other service independent building blocks.

The above is a description of the implementation of services in a case where all features can be executed in immediate temporal succession. However, some services are of such a nature that this is not possible, but one must wait between two successive features before the execution of the service can be continued. The service may be such for example to calling subscribers who are credit customers, in which case the balance of the account must be checked in between during the call. During the service, one must possibly also await a specific event, for example the calling subscriber dialling more numbers. Even after all features have been executed, the SLP instance must possibly be kept alive because one must still await an asynchronous response from the network, for example information on the calling subscriber placing the receiver on hook.

It is advantageous to implement passing of such "idle time" in the service logic as a separate feature, in order that it can be constructed as a service independent building block. In accordance with a preferred embodiment of the invention, each service program has, in addition to the other feature modules, a special feature module for passing of such "idle time". This feature module is called the idle module.

The start of the idle module comprises an instance of the halt state block HSB in which reception of asynchronous responses takes place in a halt state in which no specific response has been defined as the synchronous response (as in the halt state blocks of the other feature modules), but the parameter indicating the type of the awaited message has the value zero. It is to be noted in this context that it must be possible to receive asynchronous responses in each instance of the halt state block, since the duration of the halt state may be so long that an asynchronous response, e.g. one indicating that the calling subscriber has terminated the call, may arrive during it.

Thus, the idle module has the capability of receiving all possible asynchronous responses arriving from the network and additionally internal asynchronous responses, such as expiration of timers. The service logic must branch off from the halt state block according to the type of the asynchronous response that arrives. The processing of the asynchronous responses could be performed within the idle module, but it is nevertheless advantageous to carry out the processing exterior of the idle module in separate feature modules, preferably one being provided for each possible asynchronous response. The processing should preferably be carried out exterior of the idle module, since the processing of asynchronous responses is not necessarily similar in all service programs.

Hence, a preferred additional embodiment of the invention includes special exception blocks enabling a jump to the end of the feature module and therefrom further to the start of the desired feature module, where the asynchronous response that has arrived is processed and from the end of which one can return, when necessary, to the start of the idle module. There is a dedicated exception block instance for each possible asynchronous response. The use of exception blocks has the advantage that thereby the code of the idle module IFM can be made identical in all service programs.

Figure 11:
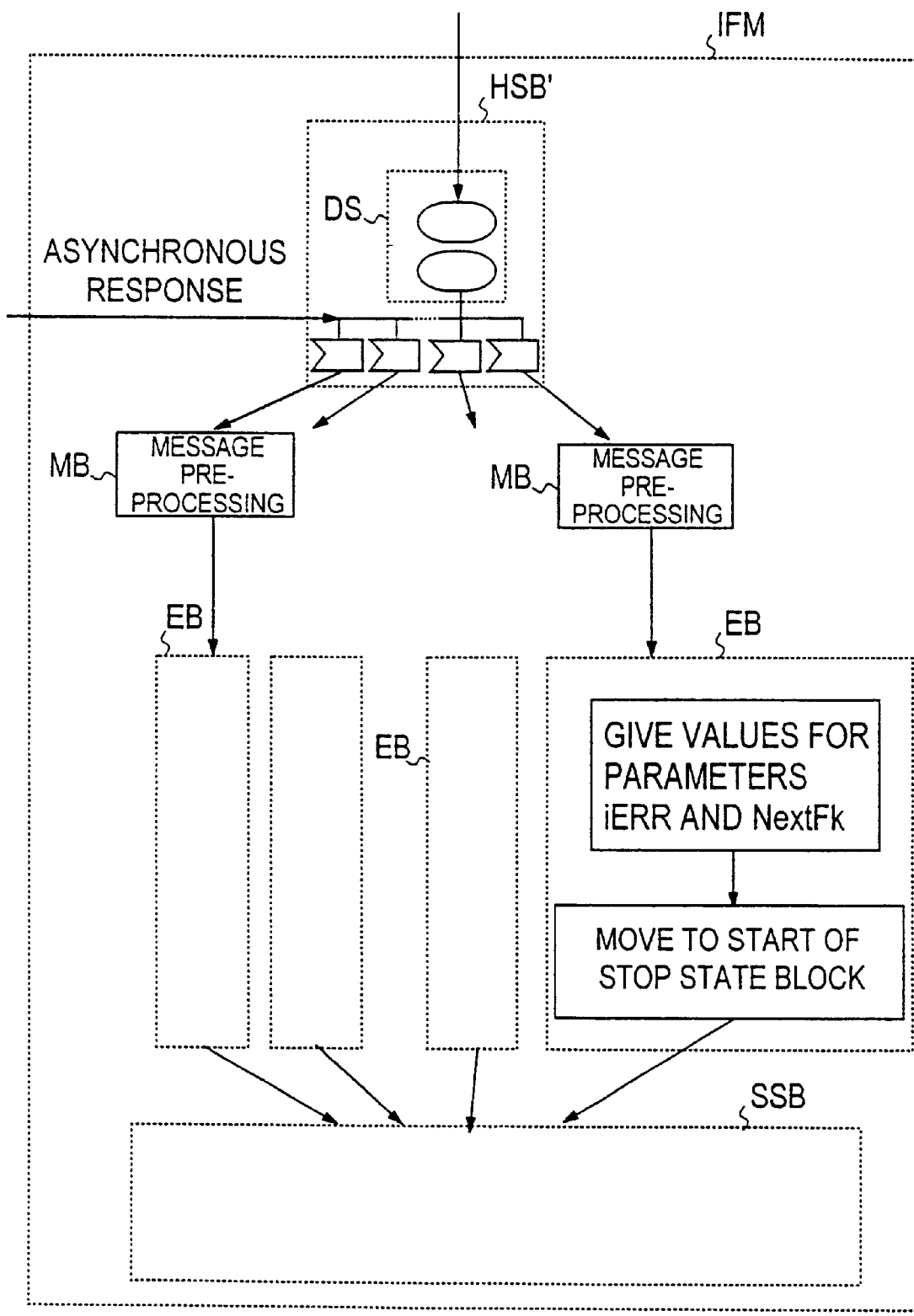
FIG. 11 illustrates a feature module in accordance with a preferred embodiment of the invention.

FIG. 11 illustrates the structure of an idle module IFM provided with exception blocks EB. From the halt state block HSB', in which all possible asynchronous responses can be received, the routine branches off after the message preprocessing block MB to a dedicated exception block instance EB according to the asynchronous response that has been received. As is shown in the figure for one exception block, in each exception block instance values are first given to parameters iERR and NextFk, and thereafter a jump is made directly to the start of the stop state block SSB located at the end of the feature module. The parameter iERR indicates whether the service logic has passed through the exception block and what kind of exceptional situation is concerned. The parameter NextFk again indicates the key of the service that is desired next.

The exception block can be used, in addition to the idle module, also in other feature modules if the service logic must branch off to an exception for example upon arrival of an error message. With the exception block, exceptions are handled in such a way that a jump is made to the end of the feature module and therefrom to the start of the given feature module.

The designer of the service program provides each instance having an exception block with an information parameter indicating the feature to whose start one must transfer next.

Figure 12:
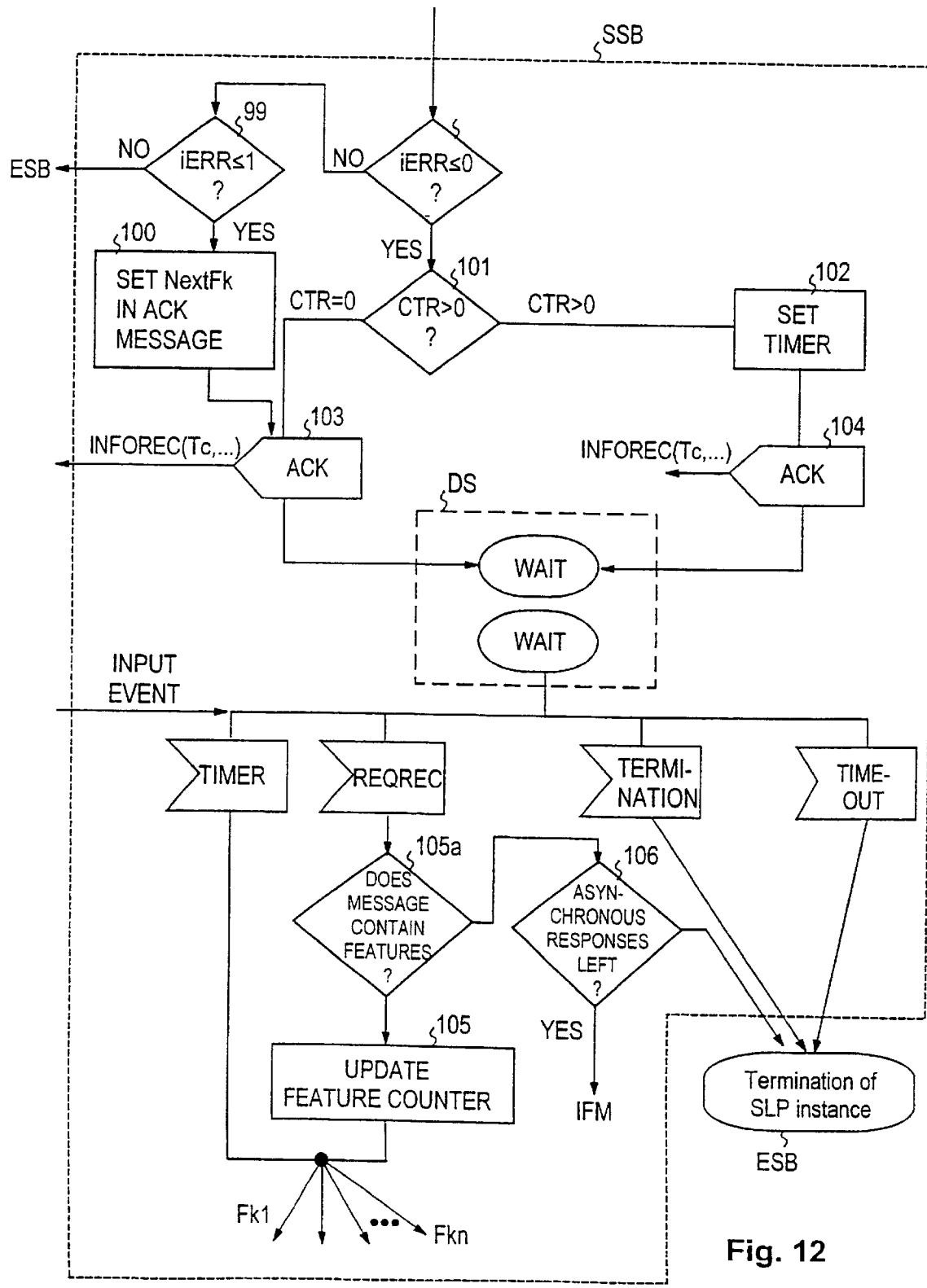
FIG. 12 illustrates a stop state block in accordance with a preferred embodiment of the invention.

If exception blocks of the kind described above are used, a test has been added to the stop state block SSB in which it is tested whether the stop state block is entered directly from an instance of an exception block and if so, what kind of exception is concerned. FIG. 12 illustrates such a stop state block which is otherwise similar to that shown in FIG. 10, but steps 98, 99 and 100 have been added to the start of the block, and steps 105a and 106 have been added after the reception of the request message. At the start of the block, it is first tested (step 98) whether the stop state block is entered from an exception block. This can be effected in such a way that the parameter iERR has otherwise the value zero, but in the exception state block it receives a value higher than zero. For example the value one can indicate that an asynchronous response has been received that requires processing in a dedicated feature module, and the value two can indicate that an asynchronous response (for example a termination message) has been received that requires termination of the service Gump to the end state block). Hence, it is tested in step 98 whether the value of parameter iERR is smaller than or equal to zero. If this is the case (that is, the stop state block has not been entered directly from the instance of the exception block), the execution of the feature proceeds in the manner described above. If the parameter has a value higher than zero, step 99 is proceeded to, in which it is tested whether the parameter has a value smaller than or equal to one (i.e. whether the value is exactly one). If the parameter has previously been given the value one, the routine proceeds to step 100, in which the value of the parameter NextFk is set in field NFk of the acknowledgement message and step 103 is proceeded to, in which an acknowledgement message is sent. If the parameter iERR has been given a value higher than one, the routine proceeds directly to the end state block ESB.

If the main program block permits the execution of the feature (NextFk) contained in the acknowledgement message as the next feature, it sends a request message REQREC containing said feature key.

In a situation where all features have been executed, the main program block can also send, instead of a termination message, a request message comprising no feature key. In such a case, it is checked from the request message (step 105a) whether it contains feature keys. If there are no feature keys, it is checked whether there are still asynchronous responses to be received from the network (step 106). If this is the case, the routine proceeds to the idle module to wait. If there are no pending responses, the routine proceeds to the end state block.

Thus, the service is terminated (the end state block is entered) when in the stop state block a situation is encountered in which (a) the main program block sends a termination message, or (b) there are no features remaining and no pending asynchronous responses either, or (c) if an internal timeout message indicating that one has awaited for too long in the delay state is received.

The feature to be executed next need not necessarily be defined in the acknowledgement message; if for example the parameter iERR is given the value 2, the service logic proceeds directly to the end state block. Such values are used in situations in which the asynchronous response received in the halt state block HSB' is such that the execution of the service is to be terminated immediately.

Each service program is thus constructed of SIBs that can be classified into the following classes according to how the different functions have been divided among them:

state blocks ISB, HSB, SSB and ESB, messaging blocks TB of messages, preprocessing blocks MB of received messages, function blocks FB, and auxiliary and special blocks.

By using the manner of identification in accordance with the invention, the data modules of the object types with which trigger data records are associated in the SSP exchanges of a fixed network and in the home location registers HLR of a mobile network can easily be identified. In this manner, the object-related data that is needed to provide a service to an individual call attempt, e.g. the data on a calling subscriber in a mobile network when a mobile-originated call is concerned, will be found rapidly.

It should further be noted that in accordance with the above implementation, not merely the database module but also the service programs of the object class corresponding to the module and the processes controlling the service programs have been transferred to the SDP network to element. In this way, the message traffic passing through the network can be diminished. However, the basic principle of the invention can be applied even though merely a database module or a database module and service programs are located in the SDP network element.

Even though the invention has been described in the above with reference to the examples in accordance with the accompanying drawings, it is obvious that the invention is not to be so restricted, but it can be modified within the scope of the inventive idea set forth above and in the appended claims. The different main object classes can also be located in different network elements, even though they have been presented in the above as all being located in the same network element. The service programs can also be implemented with the conventional structure, even though the implementation presented above is preferable, since it assists in simplifying service provisioning and in increasing the versatility in implementation of services. The solution in accordance with the invention can also be applied to implementation of services irrespective of whether subscriber-related services are produced or whether the service logic is the same for a given group of subscribers or even all subscribers. The network element sending service requests can also be the same network element as the network element receiving service requests.

What is claimed is:

1. A method for service provision in a telecommunications network comprising at least one service switching point which is adapted to send service requests containing service keys and in which objects belonging to different classes can be identified, at least one service control point adapted to receive the service requests, the method comprising:

storing service programs in at least one further network element;

storing service data of objects relating to a given object class in several data modules, the data modules being located in the at least one further network element;

providing service by starting a service program; and using the service key values in the at least one service control point receiving the service requests to identify the at least one further network element storing the data module containing the service data of the object relating to the service request.

2. The method as claimed in claim 1, wherein the service key values are further used to identify the data module in which the service data of the object are stored.

3. The method as claimed in claim 2, wherein a data table is maintained in the at least one service control point receiving service requests, said table storing for each service key value in use the address of the one further network element in which the data module of the object relating to the service request is located and additionally the identifier of the data module in which the service data of said object are stored.

4. The method as claimed in claim 2 for offering services in an intelligent network, wherein some of the data modules of an object class are stored in a service control point and some in a service data point.

5. The method as claimed in claim 2 for offering services in an intelligent network, wherein the at least one further network element comprises a service data point, the service data point also storing the service programs of the object class corresponding to the module and the processes controlling the service programs.

6. The method as claimed in claim 2 for offering services in an intelligent network, wherein several data modules of the same object class are stored in the same service control point.

7. The method as claimed in claim 5 for offering services in an intelligent network, wherein data modules belonging to several different object classes are stored in the service data point.

8. The method as claimed in claim 2, wherein data modules belonging to the same object class are identified with consecutive service key values.

9. A telecommunications network, comprising:

at least one service switching point which is adapted to send service requests containing service keys and in which objects belonging to different classes can be identified;

at least one service control point adapted to receive service requests and store service programs; and a number of separate data modules for at least one object class, in which data modules service data of objects of said classes are stored and which are located in at least one further network element, wherein the at least one service control point receiving service requests comprises identification means for identifying, on the basis of the service key value contained in the received service request, the at least one further network element storing the data module containing the service data of the object relating to the service request.

10. The telecommunications network as claimed in claim 9, wherein the data modules of at least one object class are stored both in the at least one service control point receiving service requests and in the at least one further network element communicating directly through the network with the at least one service control point receiving service requests and not directly receiving service requests from the service switching point sending them.

11. The telecommunications network as claimed in claim 10, wherein the at least one further network element is a service data point network element of an intelligent network and that the at least one further network element also stores the service programs needed by the at least one object class, in addition to the data module.

12. The telecommunications network as claimed in claim 11, wherein said service data point stores processes controlling the service programs and communicating through the network with the at least one service control point that received the service request.

13. A method for service provision in a telecommunications network comprising at least one service switching point which is adapted to send service requests containing service keys and in which objects belonging to different classes can be identified, at least one service control point adapted to receive the service requests, the method comprising:

storing service programs in at least one service data point;

storing service data of objects relating to a given object class in several data modules, the data modules being located in the at least one service data point;

providing service by starting a service program; and using the service key values in the at least one service control point receiving the service requests to identify the at least one service data point storing the data module containing the service data of the object relating to the service request.

* * * * *